Jan. 11, 1944. E. J. BAUME 2,339,135
THREADED COUPLING
Filed Sept. 21, 1942
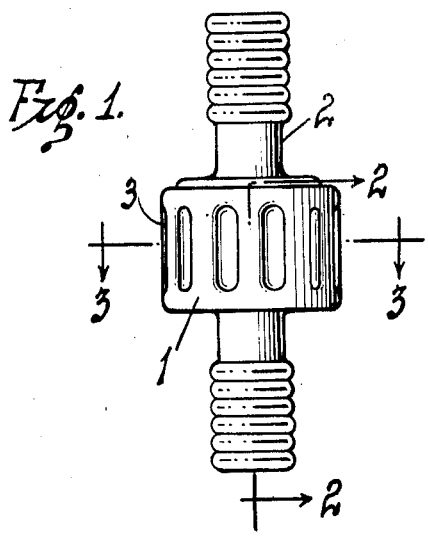
Fig. 1.
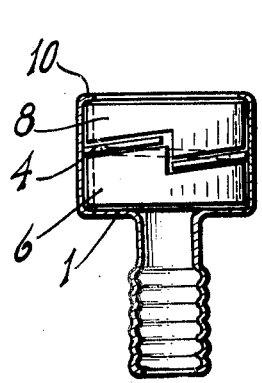
Fig. 2.
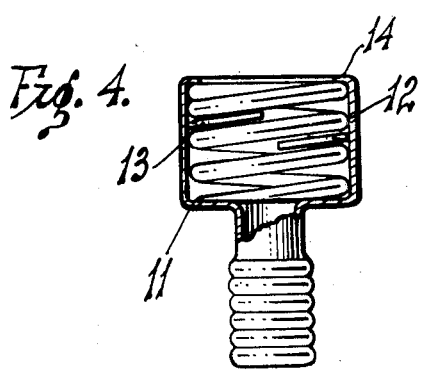
Fig. 4.
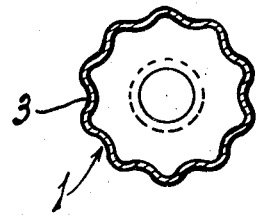
Fig. 3.
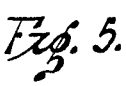
Fig. 5.
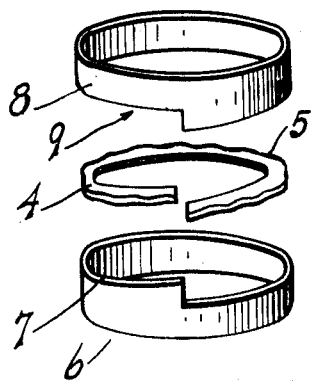
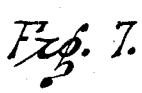
Fig. 6.
Fig. 7.
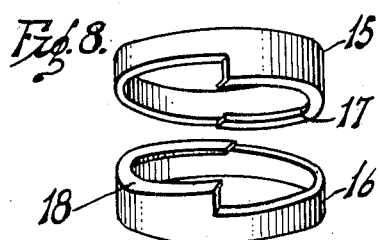
Fig. 8.
Fig. 9.
INVENTOR.
EDWALL J. BAUME.
BY
*H. A. Druckman*
ATTORNEY.

Patented Jan. 11, 1944

2,339,135

UNITED STATES PATENT OFFICE 2,339,135

THREADED COUPLING

Edwall J. Baumè, Long Beach, Calif.

Application September 21, 1942, Serial No. 459,079

3 Claims. (Cl. 85—32.1)

This invention relates to a threaded coupling for articles such as garden hoses, nozzles, hose connections, and other devices of like character.

An object of my invention is to provide a threaded coupling, which can be formed without cutting or rolling threads in one member of the coupling, but on the contrary a thread is provided, the essential parts of which can be formed in a punch press.

Another object of my invention is to provide a threaded coupling which is simple in construction, inexpensive to manufacture, and effective for those uses where it is not necessary that a tight thread be provided.

Another object of my invention is to provide a threaded coupling, of the character stated, in which the wall of the coupling member is not reduced in strength, and also the coupling member can have a perfect contour without imperfections, which a cut or rolled thread might impart to it.

Other objects, advantages and features of invention may appear from the accompanying drawing, the subjoined detailed description and the appended claims.

In the drawing

Figure 1 is a side elevation of a coupling member embodying my invention and showing both parts of the coupling threaded together.

Figure 2 is a sectional view taken on the line 2—2 of Figure 1, the inner members of the coupling being shown in elevation.

Figure 3 is a sectional view taken on line 3—3 of Figure 1 and with the inner members of the coupling removed.

Figure 4 is a side elevation of a modified form of coupling member with parts broken away to show interior construction.

Figure 5 is a perspective view of the upper collar.

Figure 6 is a perspective view of the thread ring.

Figure 7 is a perspective view of the lower collar.

Figure 8 is a perspective view of a modified form of upper collar.

Figure 9 is a perspective view of a modified form of lower collar.

Referring more particularly to the drawing, the numeral 1 indicates a shell or body of the coupling member. The numeral 2 indicates the complementary coupling member, which is externally threaded in the usual manner and screws into the shell 1, as will be further described. It is understood that the coupling members 1 and 2 may be other than those shown in the drawing, that is, they may be a nozzle or other fittings, the parts of which are threaded together.

The shell 1 is provided with circumferentially spaced flutes, grooves or splines 3. The purpose of these grooves or splines will be further described. Within the shell 1, I mount a thread ring 4 which is split and which conforms to the pitch of the thread on the coupling member 2. It is obvious that the ring 4 may include a portion of a thread or a single thread or a plurality of threads, as desired. The outer edge of the ring 4 is grooved or crimped as shown at 5 so that it may enter the grooves or flutes 3 in the shell 1, thus the ring is prevented from rotating in the shell. To hold the ring 4 against movement axially of the shell, I provide a lower collar 6, the upper surface of which is also cut to conform to the pitch of the thread, as shown at 7. The upper collar 8 is mounted in the shell 1, above the thread ring 4, and the lower surface of this collar is also cut to conform to the pitch of the thread, as shown at 9.

When the parts are assembled as shown in Figure 2, the upper edge of the shell 1 is rolled over the collar 8, as shown at 10, thus holding the thread assembly securely in position both against longitudinal and rotational movement. The transverse thickness of the thread ring 4 is greater than the wall thickness of the collars 6 and 8, this being necessary in order to engage the threads of the coupling member 2. If desired suitable means can also be provided to prevent the collars 6 and 8 from rotating in the shell, that is, the collars can be grooved to receive the splines 3 of the shell 1. In either event the thread ring will be held against rotation and against longitudinal movement, the same as previously described.

In the modified form of my invention, shown in Figure 4, a coupling shell 11 is adapted to receive a coil spring 12. This coil spring conforms to the pitch of the threads of the complementary member. A thread ring 13, identical in construction to the thread ring 4, is mounted between the coils of the spring 12. The spring is held in position in the coupling 11 and is pressed against the thread ring 13 by rolling over the top of the shell 11, as shown at 14. Either the spring 12 or the thread ring 13 or both may be held against rotation in the shell, thus enabling the complementary coupling member to be screwed into the shell 11 and thus coupled in position.

In Figures 8 and 9, I have shown a modified construction consisting of complementary collars 15 and 16. These two collars match together in the same manner as the collars 6 and 9 and set into a shell, such as the shell 1. The collars are also suitably held against rotation. The lower and upper surfaces of the collars 15 and 16 are cut to conform to the pitch of a thread. An inwardly projecting threaded flange 17 is integrally formed on the upper collar 15 and a similar threaded flange 18 is provided on the lower collar 16. These threaded flanges are preferably integrally formed with the collars and extend substantially one-half of the circumference of each of the collars, thus when the complementary collars 15 and 16 are assembled, the threaded flanges 17 and 18 will form a thread to receive another threaded member. The collars 15 and 16 are assembled in a shell and held in position in substantially the same manner as previously described.

Having described my invention, I claim:

1. A threaded coupling comprising a shell, a thread ring within the shell, said thread ring being split and conforming in shape to the pitch of a thread, upper and lower collars engaging upper and lower faces of the thread ring and having shoulders overlapping each other and constituting abutments for engaging ends of the thread ring, and flutes extending longitudinally of said shell, said thread ring having its outer edge face grooved to fit into said flutes and hold the thread ring against rotation in the shell.

2. A threaded coupling comprising a shell, a thread ring in the shell, said thread ring being split and conforming in shape to the pitch of a thread, upper and lower collars in the shell bearing against upper and lower faces of the thread ring, the faces of the collars engaging the thread ring conforming to the pitch of a thread and being spaced from each other by shoulders extending longitudinally of the shell in overlapping engagement with each other and engaging ends of the thread ring to prevent rotation of the thread ring in the shell.

3. A threaded coupling comprising a shell, a thread ring in the shell, said thread ring being split and conforming in shape to the pitch of a thread, upper and lower collars in the shell bearing against the thread ring, the faces of the collars engaging the thread ring being shaped to conform to the pitch of a thread, the upper end portions of said shell being formed with an inwardly extending flange overhanging the upper collar to retain the collars within the shell and in engagement with the thread ring and means holding said thread ring against rotation.

EDWALL J. BAUMÈ.